(12) United States Patent
Nguyen

(10) Patent No.: US 11,647,246 B1
(45) Date of Patent: May 9, 2023

(54) REMOTE CONTROL WITH TRANSMITTERS

(71) Applicant: DISH NETWORK, L.L.C., Englewood, CO (US)

(72) Inventor: Phuc H. Nguyen, Lone Tree, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 0 days.

(21) Appl. No.: 17/730,292

(22) Filed: Apr. 27, 2022

(51) Int. Cl.
*H04N 21/422* (2011.01)

(52) U.S. Cl.
CPC . *H04N 21/42221* (2013.01); *H04N 21/42222* (2013.01); *H04N 21/42224* (2013.01)

(58) Field of Classification Search
CPC ....... H04N 21/42221; H04N 21/42222; H04N 21/42224
USPC ...................................... 348/734; 340/870.03
See application file for complete search history.

(56) References Cited

U.S. PATENT DOCUMENTS 9,542,007 B2 * 1/2017 VanDuyn ........... H04N 21/4782

FOREIGN PATENT DOCUMENTS

CN 201766643 U * 3/2011

* cited by examiner

*Primary Examiner* — John W Miller
*Assistant Examiner* — Omer Khalid
(74) *Attorney, Agent, or Firm* — Oliff PLC

(57) ABSTRACT

A remote control including a first transmitter disposed along a first end of a remote control and a second transmitter disposed along a second end opposite the first end. Each transmitter is capable of transmitting a signal to an electronic component. The remote control further includes a sensor configured to detect a characteristic. The remote control also includes a processor that can determine an orientation of the remote control based upon the detected characteristic, and a can power on one of the first transmitter and the second transmitter based upon the determined orientation of the remote control.

20 Claims, 6 Drawing Sheets

REMOTE CONTROL WITH TRANSMITTERS

BACKGROUND

When viewing content in many instances, content viewers utilize a remote control to control various aspects of the content and/or a system providing such content. For example, when viewing live, recorded or streamed media on a television set, viewers often utilize the remote control to signal whether to, for example, adjust volume, change a channel, select content, and many other things. Having a compact but robust remote control capable of allowing for a content viewer to efficiently operate the content system is particularly desirable.

Many remote controls are provided to users by content providers. When effective, the utility of the remote control is often favorably viewed by the content viewer. Thus, improvements in the utility and operation of the remote control are desirable.

Remote controls often use one of a radiofrequency (RF) or infrared (IR) transmitter to transmit a signal to a receiving electronic component, for example a set-top box, a television, or another medium capable of receiving, storing, and/or displaying content. IR transmitters often fail to effectively transmit a signal if the transmittal is not facing or at least nearly facing the receiving component. RF transmitters use specific radio frequencies, such as 2.4 GHz bandwidth, to transmit the signal to the receiving device. However, RF transmitters suffer drawbacks such as a crowded bandwidth that makes the signals likely to incur interference. RF transmitters are also generally more expensive than IR transmitters. Further, in both IR and RF transmitters, and also with some other types of transmitters, when a user's hand is blocking the transmitter (e.g., when the remote control is held in a specific orientation and the transmitter is covered), both signals may fail.

SUMMARY

Various embodiments described herein provide apparatuses, systems and methods to transmit a signal in an electronic environment, particularly by using a remote control system that communicates with a set-top box, television or other electronic component. The remote control will include at least two transmitters, which enables the remote control to effectively transmit the signal regardless of an orientation of the remote control.

According to one embodiment, a remote control is provided. The remote control includes a first transmitter disposed along a first end of the remote control and configured to transmit a signal to an electronic component, and a second transmitter disposed along a second end opposite the first end and configured to transmit the signal to the electronic component. The remote control further includes a sensor configured to detect a characteristic, and a processor configured to determine an orientation of the remote control based upon the characteristic detected by the sensor, and to power on one of the first transmitter and the second transmitter based upon the determined orientation of the remote control.

According to one embodiment, a method for transmitting a signal to an electronic component is provided. The method includes determining an orientation of a remote control based upon a characteristic detected by a sensor, and powering on one of a first transmitter and a second transmitter based upon the determined orientation of the remote control. The method further includes receiving a request to transmit the signal to the electronic component, and transmitting the signal from the one of the first transmitter and the second transmitter to the electronic component.

DETAILED DESCRIPTION OF EMBODIMENTS

Figure 1:
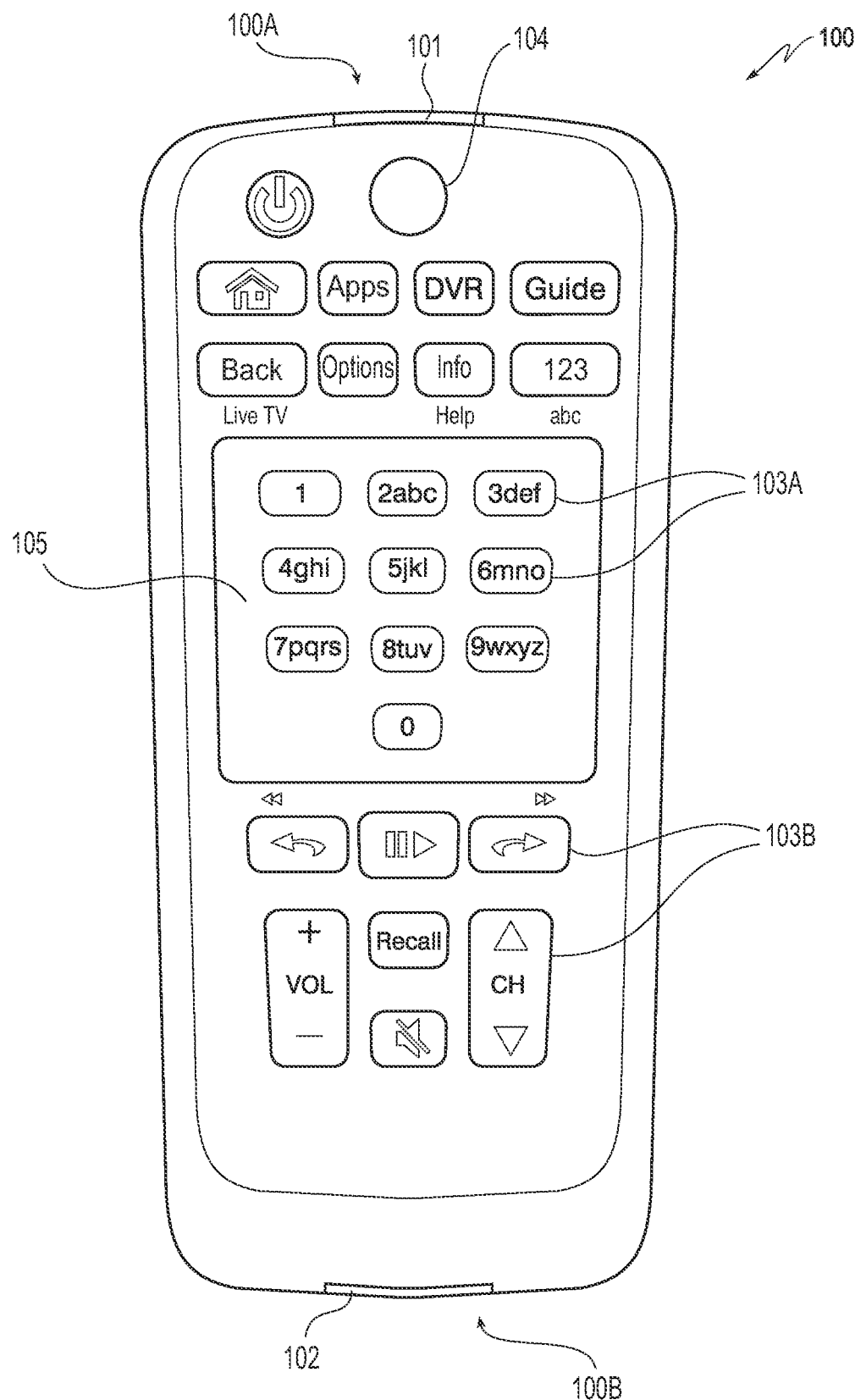
FIG. 1 shows a remote control having a first type of interface according to one or more embodiments.

The various embodiments described herein generally provide apparatuses, systems and methods regarding a remote control and transmitting a signal to an electronic component.

Interactivity between a user and a content provider may improve a user experience. Traditionally, remote controls utilize IR transmitters. IR transmissions utilize infrared waves. IR transmission generally also has a wavelength of about 700 nm to 1 mm. IR remote control transmissions generally involve sending a low-speed burst of light a predetermined distance, often up to 30 feet, and require direct line of sight with the electronic component for the transmission to be completed. Thus, when a remote control is not facing the target electronic component, such as a set-top box, television or other content provider, IR remotes often fail to properly transmit a signal requested by a user.

Some remote controls alternatively utilize RF transmitters. However, these transmitters have an increased cost compared to IR remotes, often work on a common frequency (e.g., 2.4 GHz) that leads to potential interference with other components and could lead to security risks from being on a frequency common to many devices, and also can be ineffective when, for example, a user's hand covers the transmitter.

Further, users that have mental or physical disabilities may have difficulty utilizing an IR or RF remote control properly. For example, a user having carpal tunnel syndrome may grasp a remote control in an improper configuration, for example with the front of the remote control facing the user instead of the electronic component that needs to receive the signal from the remote control. In such a case, the user may depress a button on the remote control or otherwise take an action to inform the remote control to transmit the signal to the electronic component, but the transmission may fail due to the improper orientation of the remote control. While this may be particularly notable in an IR remote control, the same deficiency may occur in an RF remote control, because the user's hand may cover the RF transmitter's antenna, therefore changing the RF characteristics of the antenna pattern.

In such a case, the user will have to manually reorient the remote control, for example by placing the remote control down, turning it, and re-grasping it in the correct orientation, or otherwise by rotating the remote control in her hand. However, such actions are undesirable, particularly for physically impaired users suffering from carpal tunnel syndrome or another deficiency relating to the hand, given the pain and difficulty that may result from needing to re-orient and re-grasp the remote control.

Further, in a situation where a user is blind or otherwise sight-impaired, the user may not recognize that the remote control does not have the correct orientation, particularly with remote controls that have much symmetry and have limited buttons (e.g., where a majority of the remote control is a touch screen). Thus, the user may have difficulty using the remote control to signal the electronic component to, for example, raise or lower the volume, or take any other action. Further, the user in this case may have increased frustration from an inability to control the electronic component and a lack of awareness as to what is causing the failure.

Even for users that lack any of the disabilities explained above, an efficient remote control that can properly transmit to an electronic component in any orientation would be desirable, as efficiency of signaling the electronic component can be achieved, and the user's experience can be improved.

FIG. 1 shows a remote control 100 according to some embodiments. As shown in FIG. 1, the remote control 100 includes a first transmitter 101 and a second transmitter 102. In some embodiments, for example as shown in FIG. 1, the first transmitter 101 is provided at or along a first end 100A of the remote control 100, and the second transmitter 102 is provided at or along a second end 100B of the remote control 100. The first end 100A may be opposite from the second end 100B. For example, in a remote control 100 that is generally rectangular in nature, the first end 100A may be a longitudinal end at the front, or top of the remote control 100 when oriented in a normal positioning (e.g., the buttons 103B being in their normal configuration), and the second end 100B may be at a longitudinal end at the back, or bottom, of the remote control 100 when oriented in the normal positioning. However, these configurations are not so limiting and the orientations may be, for example, reversed. Further, in a remote control 100 with different geometry such as a circular, triangular, or other shape, the first transmitter 101 and second transmitter 102 may be provided in various configurations, with one of the first transmitter 101 and second transmitter 102 being in a location that is closer to a front end of the remote control 100 than the other one of the first transmitter 101 and second transmitter 102 is.

Further, while FIG. 1 shows first transmitter 101 along the first end 100A and second transmitter 102 along the second end 100B, it should be understood that the first and second transmitters 101, 102 need not necessarily be at or along ends of the remote control 100. They may instead be embedded or placed on or near other parts of the remote control 100, provided that one of the first transmitter 101 and second transmitter 102 is in a location that is closer to one end of the remote control 100 than the other one of the first transmitter 101 and second transmitter 102 is to that same end. That is, so long as the first transmitter 101 and second transmitter 102 are in different places on or within the remote control 100, the remote control 100 may function according to the description provided herein.

Further, the first transmitter 101 and/or second transmitter 102 may be placed along different locations where, for example, one may be on the top side of the remote control and the other may be on the bottom side of the remote control, or the transmitters may be on opposite axial sides of the remote control. Such a configuration may also be advantageous for someone with a disability where the remote may be held askew but not necessarily entirely backwards.

As shown in FIG. 1, the remote control 100 also includes various buttons 103B provided on the top face of the remote control 100. These buttons, when activated, may result in a signal being transmitted to an electronic component, such as a set-top box and/or a display unit such as a television unit, a laptop, cellular phone, tablet, or any other display unit capable of receiving and displaying content. The signal may be transmitted by one, or both, of the first transmitter 101 and the second transmitter 102. That is, each of the first transmitter 101 and the second transmitter 102 is capable of transmitting the same signal, initially requested by a user or the like via the pressing of buttons 103B or other buttons such as touch-screen buttons 103A, to the electronic component. However, in some embodiments, only one of the first transmitter 101 and second transmitter 102 will actually perform the transmission of the signal to the electronic component.

These buttons 103B may include, for example, one or more power buttons, a home screen button and a button to activate apps. The apps button may allow access to a digital marketplace that includes options to purchase (or freely receive) content, products, and various other applications.

One example of a digital marketplace is a cloud-based store. The cloud-based store is a platform that can allow a user's television and/or gateway to allow bidirectional communication by providing a cloud-based platform having a marketplace that allows third party service providers (e.g., neighborhood yoga instructor, local hospital provider, national gym, etc.) to provide services to the users via an application created by such third party service providers (without hiring a programmer). In this regard, the third party service providers will be able to use the cloud-based platform to create, using their devices, their own interface that will be used by the consumers, and this interface allows the third party provider to provide a service to the consumer. Once the application is developed by the third party server provider, the application is "pushed" or transferred to the subject user's set top box without the user requesting such applications and optionally without any cost to the user.

Other examples of buttons 103B include buttons to control live TV or recorded content, such as rewind, fast forward and pause/play buttons. Volume control buttons may also exist, and may be coordinated with a television unit or other display unit to control the volume on the unit without signaling to a set-top box. The remote control 100 may have other buttons 103B, for example as shown in FIG. 1 or in addition to those shown in FIG. 1. While not shown, remote control 100 may include additional buttons 103B that may be specific programmable buttons, and/or an audio button that activates a microphone may be included on the top face of the remote control 100 or along a side of the remote control 100.

As shown in FIG. 1, the remote control 100 may also have a touch screen 105. The touch screen 105 may include various programmable and/or changeable touch-screen buttons 103A. These touch-screen buttons 103A may change based upon a user preference, e.g., for example when the user presses the one of the buttons 103B shown as the "123" button, the touch screen 105 will display numerals 0-9 as touch-screen buttons 103A on the touch screen 105, and the user may then select a number or combination of numbers by touching the appropriate touch-screen buttons 103A on the touch screen 105. The touch screen 105 may also show other different touch-screen buttons 103A at other various times, for example touch-screen buttons 103A that may control operation of a programming guide, a digital video recorder (DVR), a menu, and so on. While an embodiment showing both touch-screen buttons 103A and buttons 103B is shown, implementations in which the remote control 100 has all buttons to be a part of the touch screen (e.g., there are no buttons 103B and there are only touch-screen buttons 103A) is within the scope of this disclosure.

FIG. 1 also shows the remote control 100 having a sensor 104 provided therein. While the sensor 104 is shown at the first end 100A, it may alternatively be provided near the first end 100A, or at or near second end 100B. Further, the sensor may be provided in a different location on or within the remote control 100.

The sensor 104 may be a type of positioning sensor and/or proximity sensor, and may also be a gyroscope and/or accelerometer. The sensor may also be a touch sensor. The sensor thus may detect a particular characteristic, such as a relative position of itself or to some fixed or other component, relative proximity to some fixed or other component, orientation, angular velocity, angular acceleration, and the like.

Figure 2:
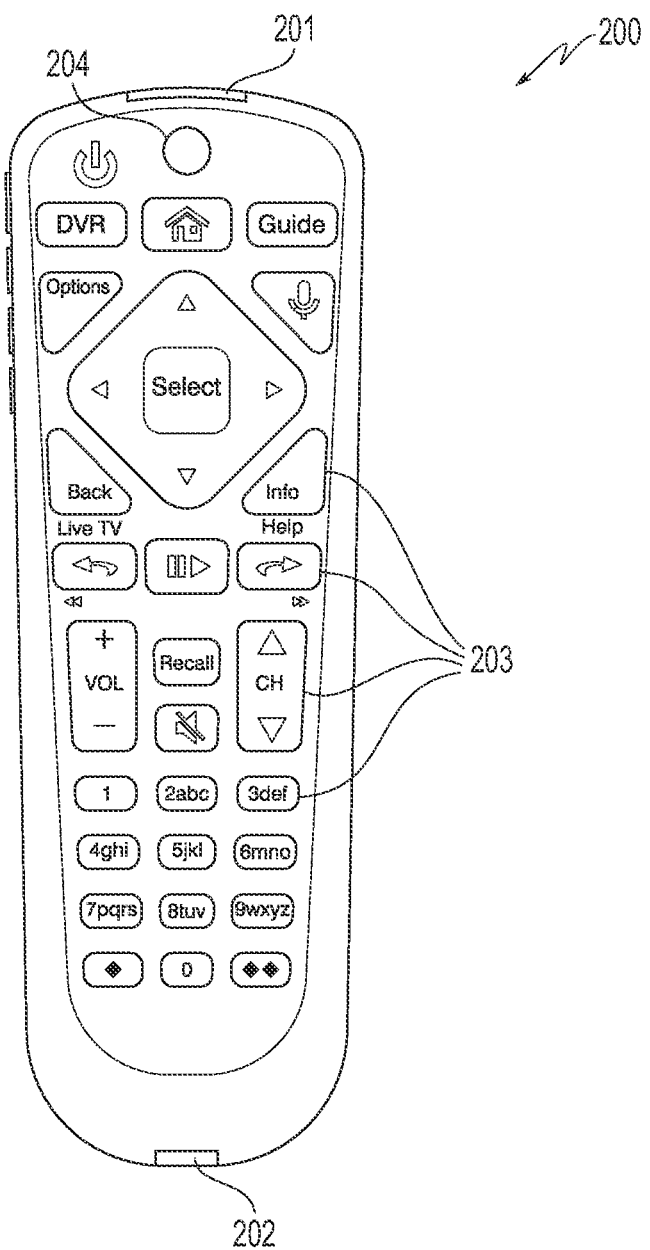
FIG. 2 shows the remote control having a second type of interface according to one or more embodiments.

FIG. 2 shows a remote control 200 with many characteristics similar to the remote control 100 of FIG. 1. The remote control 200 includes first transmitter 201 and second transmitter 202, which are shown as provided on opposing ends of the remote control 200. The possible configurations and orientations of the first transmitter 201 and second transmitter 202 are not so limited, and are similar to those described with reference to the first transmitter 101 and second transmitter 102 described with reference to FIG. 1. FIG. 2 also includes a sensor 204 and additional buttons 203, which are comparable to sensor 104 and buttons 103B in FIG. 1. However, the remote control 200 lacks a touch screen, and instead includes additional buttons 203 such as the digits 0-9. The remote control 200 of FIG. 2 otherwise functions substantially the same as the remote control of FIG. 1, as described with respect to FIG. 1 and all later Figures discussed herein.

Figure 3:
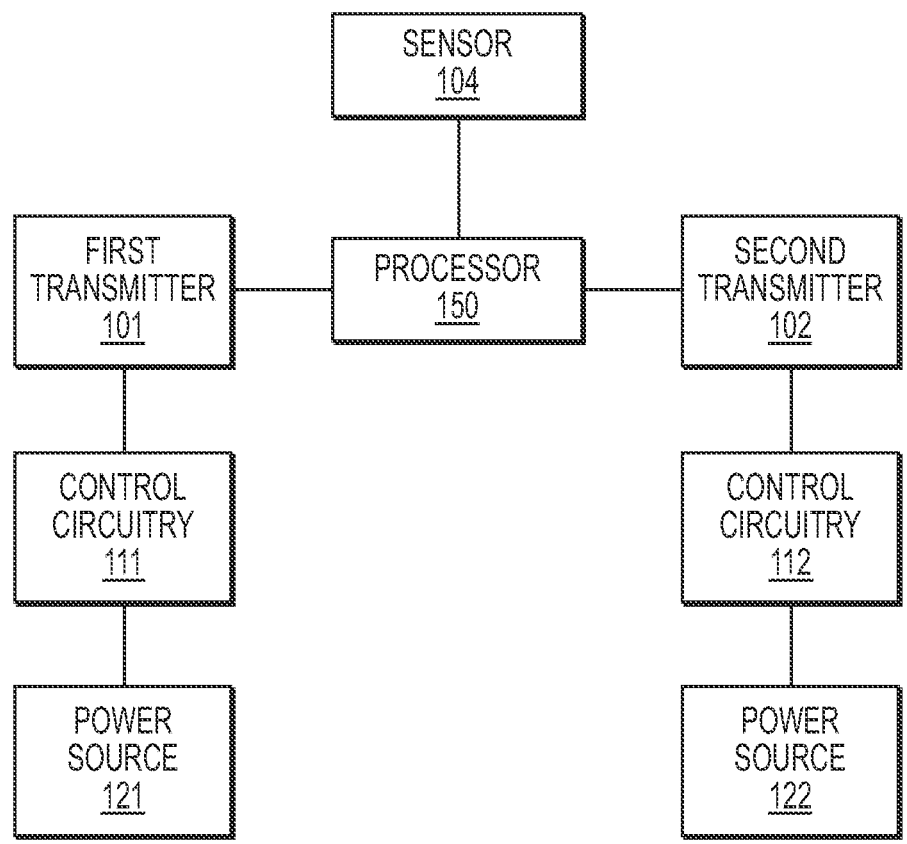
FIG. 3 shows a system diagram of a remote control according to one or more embodiments.

FIG. 3 shows a system diagram according to some embodiments. The system may include a remote control 100 that includes, therewithin, the first transmitter 101, the second transmitter 102, and a sensor 104. The first transmitter 101 may be a light emitting diode (for IR transmission) and thus an IR transmitter, or may be an RF transmitter, wireless transmitter or transmitter using some other form of near field communication such as Bluetooth. The first transmitter 101 may have control circuitry 111 that may include hardware including one or more of microcomputer and driving circuit. The first transmitter 101 may also have its own power source 121, which may or may not be the same power source that other parts of the remote control draw power from. The power source 121 may be a battery. The battery may or may not be rechargeable. The power source may also be another type of power source, such as AC power or another type of DC power.

The second transmitter 102 may be a light emitting diode (for IR transmission) and thus an IR transmitter, or may be an RF transmitter, wireless transmitter or transmitter using some other form of near field communication such as Bluetooth. The second transmitter 102 may have control circuitry 112 that may include hardware including one or more of microcomputer and driving circuit. The second transmitter 102 may also have its own power source 122, which may or may not be the same power source that other parts of the remote control draw power from. The power source 122 may be a battery. The battery may or may not be rechargeable. The power source may also be another type of power source, such as AC power or another type of DC power. In some embodiments the power source 121 and 122 are the same power source, or at least are parts of a single power source. Further, while two separate transmitters with separate circuitry are shown, the first transmitter 101 and second transmitter 102 may share some of the same circuitry, and/or may be a part of a single, double-sided transmitter whereby the first transmitter 101 of the single transmitter or the second transmitter 102 of the double-sided transmitter selectively activates according to the embodiments described herein.

Also included within the remote control 100 is a hardware processor 150. The hardware processor 150 may include a central processing unit and/or a microcomputer, and may be specialized to receive instructions from one or more of the first transmitter 101, the second transmitter 102, the sensor 104, and/or other parts of the remote control. The hardware processor 150 may either being a separate component of the remote control connected to the sensor 104, or may be a part of the sensor 104. The hardware processor 150 may also comprise two processors, one within the sensor 104 and one being separate, the two processors in communication with each other so as to allow for transfer of data and results of detections by the sensor 104.

Further disposed within or on the remote control is the sensor 104. The sensor may detect a particular characteristic, such as a relative position, relative proximity, orientation, angular velocity, angular acceleration, or the like. The sensor may include its own microcomputer, in which case it may be capable of making specialized determinations about the orientation of the remote control using the detected characteristic. The sensor 104 may additionally or alternatively be able to communicate the data derived therein to the hardware processor 150, so that the hardware processor 150 may make the specialized determinations about the orientation of the remote control 100 using the detected characteristic.

Figure 4A:
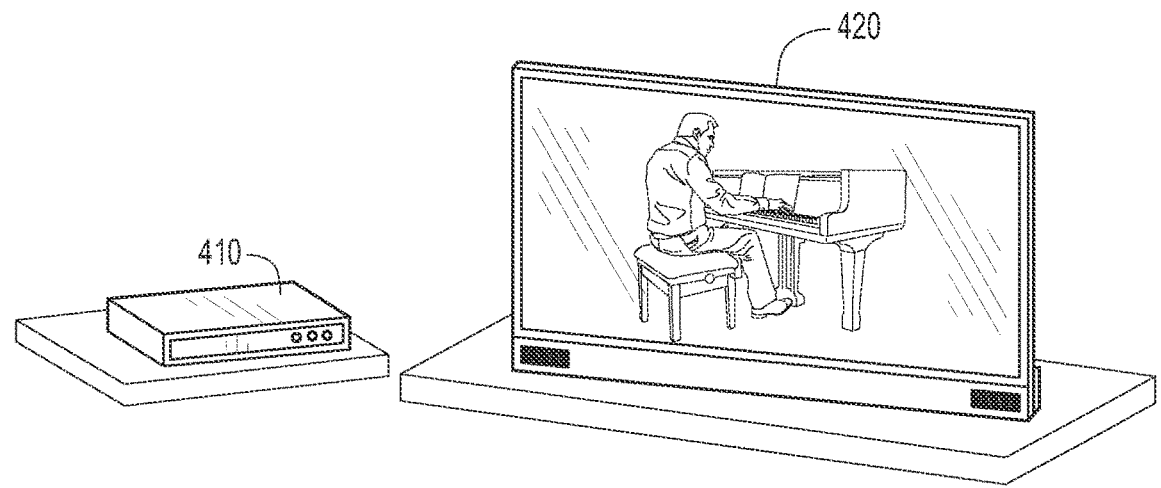
FIG. 4A shows a pictorial diagram of the remote control in use before orientation sensing according to one or more embodiments.
Figure 4A:
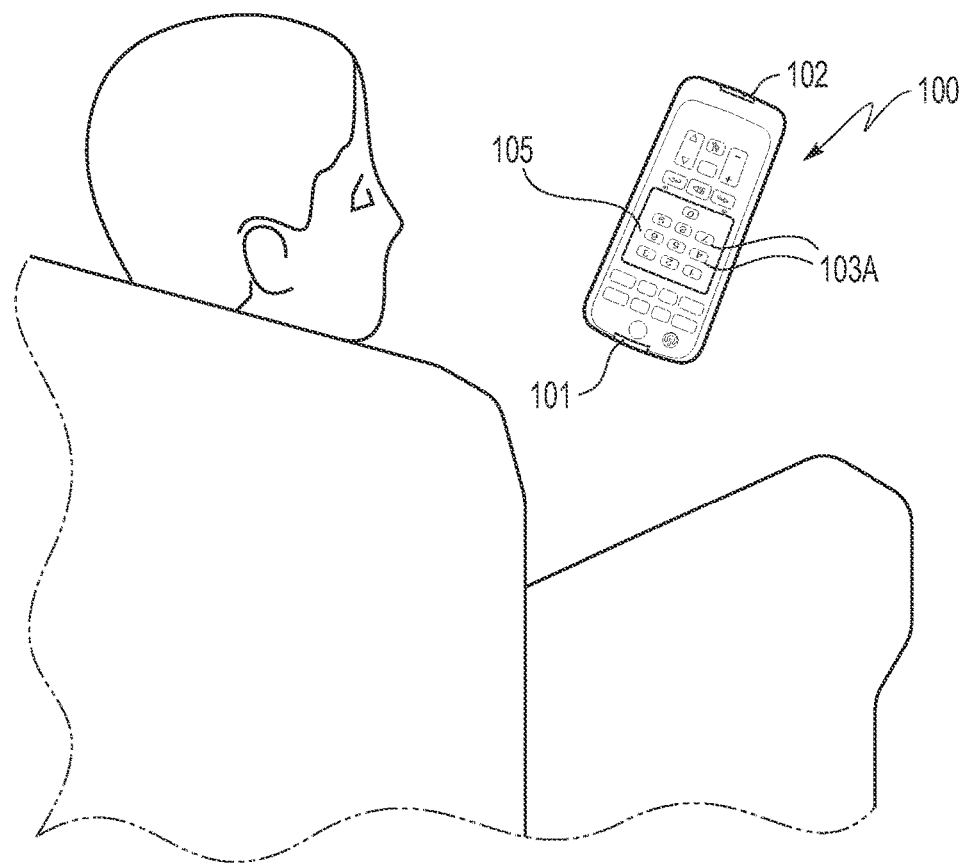
Figure 4B:
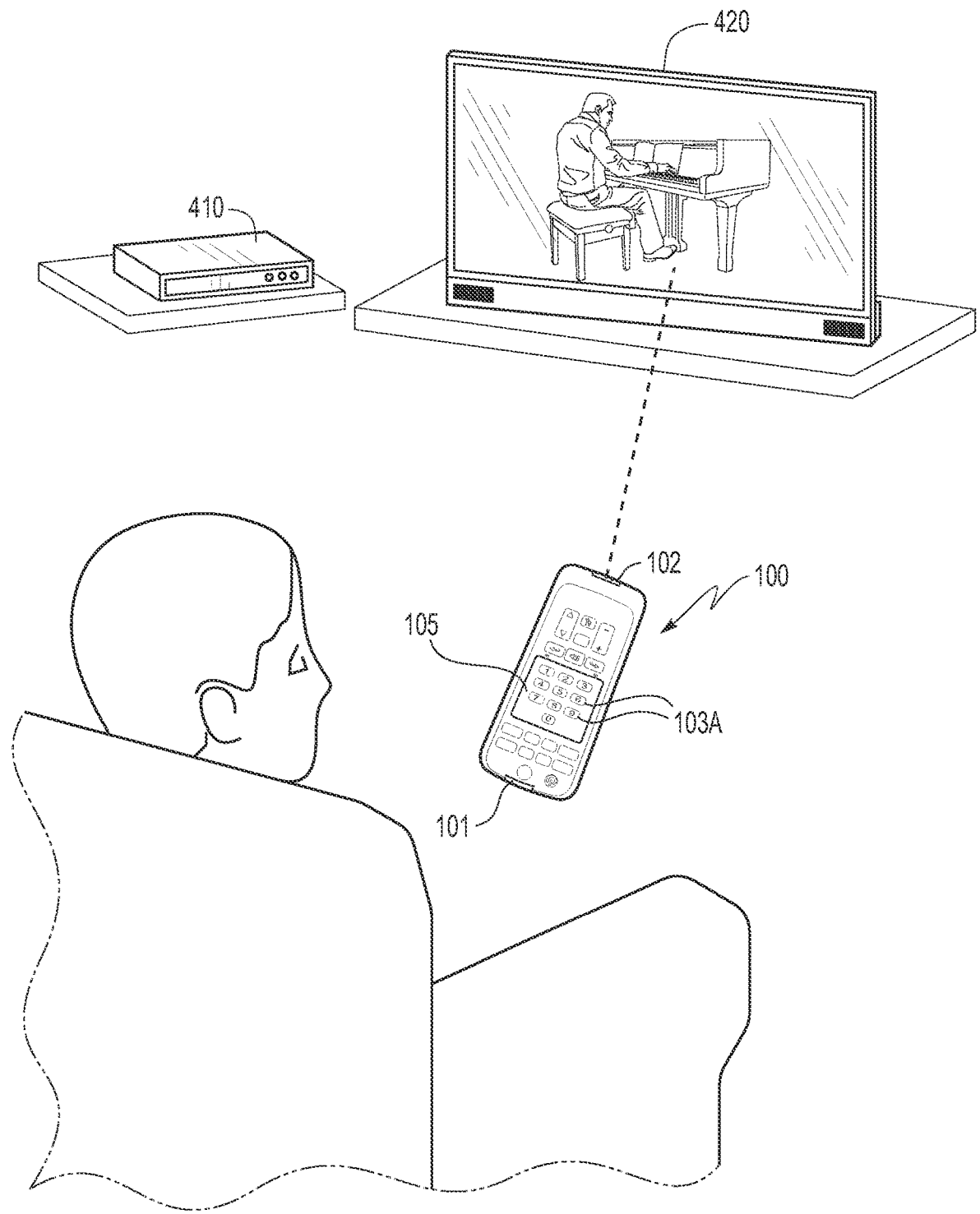
FIG. 4B shows a pictorial diagram of the remote control in use after orientation sensing according to one or more embodiments.

FIGS. 4A and 4B show an operation of the remote control 100. In the configuration shown in FIG. 4A, a user is intending to operate the remote control 100 to, for example, communicate with the set-top box 410 or display unit 420.

Examples of functions that the user may intend to communicate with the set-top box 410 are to change a station, operate and/or manipulate a DVR, activate and/or operate within a digital marketplace such as a cloud-based store, and/or any function that involves communication with a content provider. The set-top box 410 may be a box-shaped device that converts a digital television signal to analog for viewing on the display unit 420, or that enables cable or satellite television to be viewed. The set-top box 410 may be owned by a user, or may be leased by a user from a content provider. The set-top box 410 may have capability, via wireless internet, satellite or cable communication or the like, to communicate with remote servers owned or hosted by the content provider, so as to provide access to content to a user via the set-top box 410.

Examples of functions that the user may intend to communicate with the display unit 320 may be to change a volume on the display unit 420. The display unit may be a television unit, a laptop, cellular phone, tablet, or any other display unit capable of receiving and displaying content. Further, in the cases where the display unit is a Smart TV or another display unit capable of connecting to the internet via wireless technology, the user may also communicate, using remote control 100, functions to change a station, operate and/or manipulate a DVR, activate and/or operate within a digital marketplace such as a cloud-based store, and/or any function that involves communication with the content provider.

As shown in FIG. 4A, a user has picked up the remote control 100, but in an orientation where the buttons 103B are facing backwards. In conventional technologies where a single RF or IR transmitter is placed at the front end of the remote control so that the transmitter can have an unobstructed line of sight with the electronic component when pointed accordingly, such a configuration could have failure potential when the user operates the remote control in this backwards configuration. However, as shown in FIG. 4A, though the first transmitter 101 is facing away from the electronic components (in this case, one or both of the display unit 420 and the set-top box 410), second transmitter 102 is facing closer to the display unit 420 and the set-top box 410.

Figure 5:
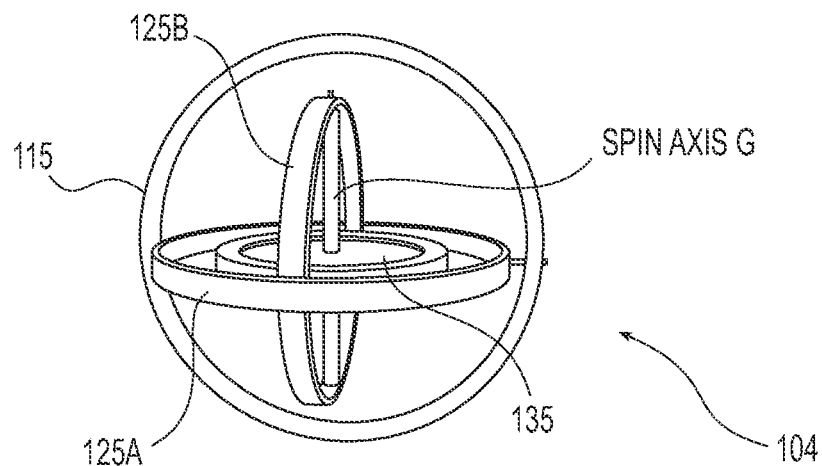
FIG. 5 shows a structure of a sensor according to one or more embodiments.

At some time point after the user grasps the remote control, the sensor 104 will detect the characteristic, and then either on its own or via the hardware processor 150, determine a positional orientation of the remote control 100. In a case where the sensor 104 is a gyroscope, as shown in FIG. 5 and described in more detail with reference to FIG. 5, the sensor 104 will detect its orientation relative to itself or to one or more other components within the remote control 100, and/or with respect to the electronic component, and ultimately, utilizing a hardware processor connected thereto such as its own hardware processor or hardware processor 150, determine which of the first transmitter 101 and second transmitter 102 is in a position closer to the display unit 420 and the set-top box 410.

As shown in FIG. 4B, the second transmitter 102, which is determined to be closer to relevant electronic component of the display unit 420 and the set-top box 410, will be activated and will transmit a user-prompted transmission signal to the recipient electronic component. As also shown in FIG. 4B, the touch-screen buttons 103A will be rotated 180 degrees so that the touch-screen buttons 103A on the touch screen 105 can be in a configuration more readily and easily viewable to the user. The rotation of touch-screen buttons 103A may occur, for example, whenever the hardware processor 150 recognizes that the touch-screen buttons 103A are in an improper orientation. One example of the recognition can occur when the hardware processor 150 recognizes that the one of the first transmitter 101 and second transmitter 102 that is determined to be closer to the electronic component and thus chosen to transmit the next signal is a different transmitter than the one that transmitted an immediately previous signal in an immediately preceding transmission. However, the rotation of touch-screen buttons 103A may occur based more generally upon a detection of the characteristic by sensor 104, and/or by a determination of the orientation of the remote control based upon such a detected characteristic.

In some embodiments, the first transmitter 101 and second transmitter 102 may be IR transmitters. However, the instant embodiments are not so limited and the first transmitter 101 and second transmitter 102 may be RF transmitters, and may also communicate via wired, wireless, Bluetooth or some other near field communication.

In some embodiments, the user-prompted transmission signal is prompted by the user depressing a button, such as one of the buttons 103B. The user-prompted transmission signal may also be prompted by the user pressing, hovering over, or otherwise activating one or more of the touch-screen buttons 103A.

The determination as to the orientation of the remote control 100 may be before, after, or during the transmission of the user-prompted transmission signal. For example, the remote control 100 may continually determine its orientation using the sensor 104 at a predetermined frequency, for example once per minute, once per hour, once per four hours, or once per day. The remote control 100 may also determine its orientation immediately after the user grasps the remote control 100, which may be determined by one or more touch sensors, light sensors or pressure sensors in or around the remote control 100. Such sensors may be included within the sensor 104, but may also be separate sensors.

Once the orientation determination procedure of the remote control 100 is initiated, the sensor 104 may be activated to detect a characteristic which will ultimately allow for the sensor 104 and/or hardware processor 150 to determine the orientation of the remote control 100. In embodiments where the sensor 104 is located at or toward one end of the remote control 100, the sensor 104, either using its own internal hardware processor or by transmitting signals to a hardware processor 150 embedded within the remote control 100, which of the first transmitter 101 and second transmitter 102 is closer to and/or facing the target electronic component. The sensor 104 may do so by determining its relative distance to a grip of a user's hand and/or location of pressure (for example given that a user's hand generally grasps the remote toward the back of the remote control), or by directly determining its own distance to the target electronic component or to some other fixed component.

Once the sensor 104 has completed its detection, a result of the detection is sent to the hardware processor 150 within the remote control 100. The hardware processor 150 will either make a determination based upon the detection, or otherwise receive the determination if the sensor 104 includes its own hardware processor capable of making the determination, and take an appropriate action.

For example, the hardware processor 150 and/or a hardware processor within sensor 104 may determine whether the first transmitter 101 or the second transmitter 102 is closer to the target electronic component. Once the determination is made, the determination may be stored in a memory so that the current orientation of the remote control 100 is known.

Either before, after or during a user request to transmit a signal to the target electronic component, the hardware processor 150 will, using the result of a subsequent determination of the orientation of the remote control 100 or using a stored result of a previous determination of the orientation of the remote control 100, activate the one of the first transmitter 101 and second transmitter 102 that is closer to the target electronic component. The activated one of the first transmitter 101 and second transmitter 102 may then transmit the user-requested signal to the target electronic component.

In some embodiments, either before, after or during the user request to transmit a signal to the target electronic component, the hardware processor 150 will, using the result of a subsequent determination of the orientation of the remote control 100 or using a stored result of a previous determination of the orientation of the remote control 100, temporarily disable the other of the first transmitter 101 and second transmitter 102 (e.g., the one that is farther from the target electronic component). Such an action may improve the transmission capability of the activated one of the first transmitter 101 and second transmitter 102 by reducing noise and/or interference from the other transmitter, and may also save on power by avoiding an unnecessary transmission. In some embodiments, the disabled transmitter will be disabled for a predetermined period of time, such as about 1 to about 30 seconds, or about 2 to about 5 seconds, or about 3 seconds.

The determination of the orientation of the remote control 100, and/or the activation and/or deactivation of the appropriate ones of the first transmitter 101 and second transmitter 102, may occur every time the user makes a requested signal transmission (e.g., each time the user depresses and/or touches buttons 103B or touch-screen buttons 103A), or may occur at other predetermined time points, such as each time that a user picks up the remote control, or every hour, or few hours, or the like.

In embodiments where the remote control 100 includes a digital touch screen 105, the touch-screen buttons 103A may be rotated to a position where they would be in their natural orientation for the user. This may further improve the user experience. This rotation may occur at a time point when the sensor 104 and/or hardware processor 150 initially determines the orientation of the remote control 100, so as to allow the user the most user-friendly experience with the remote control 100. The rotation may also occur at some other time point, and may occur each time it is deemed necessary based upon the determination of the orientation of the remote control 100.

Owing to the configuration described above, a user may be able to efficiently transmit a desired signal to an electronic component (e.g., set-top box 410 or display unit 420) using the remote control 100, regardless of the orientation of the remote control, without a need to re-grip, rotate, or otherwise change the initial configuration of the remote-control. The features described herein may also be advantageous for someone with a disability it is not easy for one to re-grip the remote control, or where one cannot see that the remote control may have been held backwards. Further, the system may advantageously disable the non-used transmitter so that less power usage can occur, and so that interference can be avoided.

FIG. 5 shows a gyroscope as an exemplary sensor 104. The gyroscope may include a wheel or rotor 135 that is mounted to two gimbals 125A, 125B providing pivoted supports, which allows the rotor 135 to rotate about a single axis such as spin axis G. The sensor 104 may also include a frame 115 serving as an outer frame of the gyroscope. The gyroscope may determine an angular velocity, which may enable the remote control 100, either using its own processor or by transmitting its angular velocity detection to the hardware processor 150 of the remote control 100, how the remote control 100 is oriented with respect to one or more of a user's hand/grip and the target electronic component. The gyroscope may, for example, be able to determine its distance or orientation with respect to one or more of the first transmitter 101 and second transmitter 102, and ultimately either detect or aid in the detection of which of the first transmitter 101 and second transmitter 102 is closer to the target electronic component. The gyroscope may be provided at or near one of the ends of the remote control, for example along the first end 100A or second end 100B.

Further, multiple gyroscopes may be used, working either together or independently, so as to determine the orientation of the remote control 100. For example, in some situations, multiple sensors 104 are provided at different positions, where and the determination of the orientation of the remote control occurs by measuring which of the sensors is closer to, or farther from, the user's grip, or the target electronic component, or some other fixed component. For example, the sensor 104 may include a first sensor and a second sensor, the first sensor disposed closer to the first end of the remote control 100 than to a midpoint of the remote control 100, the second sensor disposed closer to the second end of the remote control 100 than to the midpoint of the remote control, the first sensor and the second sensor each configured to detect a distance from the respective first sensor and the second sensor to a fixed point. Further, when the first sensor is detected to be closer to the fixed point than the second sensor is to the fixed point, the hardware processor 150 may be configured to power on the first transmitter 101 and power off the second transmitter 102, and when the second sensor is detected to be closer to the fixed point than the first sensor is to the fixed point, the hardware processor 150 is configured to power on the second transmitter 102 and power off the first transmitter 101.

Additionally or alternatively, a chip-based design gyroscope such as a microelectromechancial system (MEMS) gyroscope may be used as the sensor 104. This may be used either concurrently with an accelerometer or on its own. In some implementations, the MEMS gyroscope will use a vibrating mechanical element as a sensing element for detecting the angular velocity and, either with an accelerometer configured to determine angular acceleration or on its own, transmit information that allows for the hardware processor 150 to understand a relative location of the first transmitter 101 and second transmitter 102 with respect to the electronic component, the sensor 104, and/or another fixed point.

While a gyroscope is described with respect to FIG. 5, other types of sensors may be used as sensor 104 in addition to or in lieu of the gyroscope. For example, an accelerometer or another type of position sensor, a proximity sensor, or a touch sensor may also be used. Such exemplary sensors may again be used to determine a relative orientation of the remote control 100, either by detecting where a user is contacting the remote control 100, or the location of the sensor with respect to a target electronic component and other fixed locations. For example, in the case where a proximity sensor or position sensor is used, the sensor may be located somewhere closer to one of the first transmitter 101 and second transmitter 102 (e.g., not directly in the middle), and can then determine a distance from the sensor to one or both ends of the remote control 100, and then also to the target electronic component, with the hardware processor 150 or the sensor 104 itself determining the difference between it and the target electronic component and it and one or both ends, so as to determine which end is closer to the target electronic component, and, ultimately, the distance to the electronic component. Further, when a touch sensor is used, the touch sensor may be oriented somewhere along a bottom face of the remote control 100 and may be uniquely configured to understand a user's grip, and thus can detect, pressure differences at touch points within the remote control 100. This can allow the sensor 104, in combination with hardware processor 150, hardware processor 150 either being a part of the sensor 104 or at a separate part of the remote control 100, to detect the orientation of the remote control and which of the first transmitter 101 and second transmitter 102 is oriented closer to the target electronic component.

Figure 6:
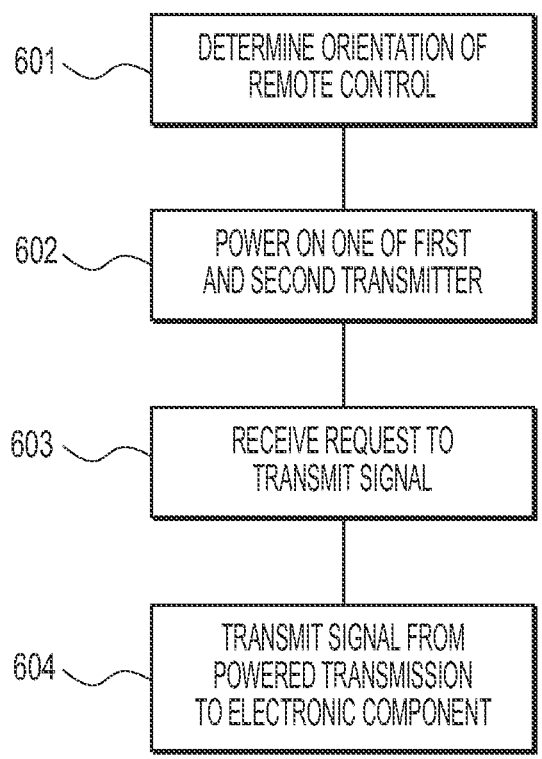
FIG. 6 is a flow diagram illustrating an exemplary method according to one or more embodiments.

FIG. 6 shows a flow diagram of methods according to some embodiments. In a step 601, a determination of the orientation of the remote control 100 is made. This may be done using the hardware discussed with reference to FIGS. 1-5.

In step 602, one of the first transmitter 101 and second transmitter 102 may be powered on. This may involve an active powering on of the appropriate transmitter, or by maintaining a powered on state of the appropriate transmitter. For example, when first transmitter 101 is intended to be utilized based upon the determination of the orientation of the remote control, but it is already activated, step 602 results in the first transmitter 101 staying turned on.

Either within or as an additional step, based upon the result of step 601, the transmitter of the first transmitter 101 and the second transmitter 102 that is not intended to be utilized will be turned off or maintained in an off state. However, in some embodiments, both the first transmitter 101 and the second transmitter 102 may stay on. This may allow for an advantage where, for example, if the user does not want to hold or grasp the remote control 100 in his hand but instead prefers it to lay on a surface such as a table or arm rest, the user can press the buttons 103B or touch-screen buttons 103A and transmit the signal properly regardless of the orientation of the remote control (e.g., even if the remote control 100 is oriented horizontally, for example). Further, in such a situation, the touch-screen buttons 103A may also rotate by 90 degrees if the remote control 100 is horizontal with respect to the user's location so that the touch-screen buttons 103A are reoriented toward the user, the remote control 100 having its orientation determined based upon one or more of the embodiments described previously.

As a step 603, the method may involve receiving a request to transmit a signal. This may be, for example, a user pressing buttons 103B or touch-screen buttons 103A of the remote control 100, which will signal the remote control 100 that a transmission is intended by the user. This may occur before, during or after steps 601 and 602.

After steps 601-603, the methods include a further step of transmitting the signal from the one of the first transmitter 101 and second transmitter 102 that is determined to be in the appropriate position, to an electronic component, such as a set-top box 410 or display unit 420.

While the instant embodiments were described with respect to a remote control being used for communication with a display unit and/or set-top box, the instant disclosure is not so limited. The remote control may be utilized for other applications, such as any applications where transmitting a signal to an electronic component is desirable. This may include, among other things, opening a garage door, or activating a radio, or the like.

Although specific embodiments were described herein, the scope of the invention is not limited to those specific embodiments. The scope of the invention is defined by the following claims and any equivalents therein.

As will be appreciated by one skilled in the art, aspects of the present disclosure may be embodied as a system, a method or a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

What is claimed is:

1. A remote control, comprising:
a first transmitter disposed along a first end of the remote control and configured to transmit a signal to an electronic component;
a second transmitter disposed along a second end opposite the first end and configured to transmit the signal to the electronic component;
a sensor configured to detect a characteristic; and
a processor configured to:
determine an orientation of the remote control based upon the characteristic detected by the sensor, power on one of the first transmitter and the second transmitter based upon the determined orientation of the remote control, and power off an other of the first transmitter and the second transmitter based upon the determined orientation of the remote control, so as to restrict transmission of the signal to the electronic component by the other of the first transmitter and the second transmitter.

2. The remote control according to claim 1, wherein the other of the first transmitter and the second transmitter is powered off for a predetermined period of time.

3. The remote control according to claim 2, wherein the predetermined period of time is about 2 to about 5 seconds.

4. The remote control according to claim 1, wherein the sensor is a gyroscope.

5. The remote control according to claim 4, wherein the gyroscope is disposed at either the first end or the second end of the remote control.

6. The remote control according to claim 1, wherein the sensor is a proximity sensor.

7. The remote control according to claim 1, wherein the sensor includes a first sensor and a second sensor, the first sensor disposed closer to the first end of the remote control than to a midpoint of the remote control, the second sensor disposed closer to the second end of the remote control than to the midpoint of the remote control, the first sensor and the second sensor each configured to detect a distance from the respective first sensor and the second sensor to a fixed point.

8. The remote control according to claim 7, wherein when the first sensor is detected to be closer to the fixed point than the second sensor is to the fixed point, the processor is configured to power on the first transmitter and power off the second transmitter, and when the second sensor is detected to be closer to the fixed point than the first sensor is to the fixed point, the processor is configured to power on the second transmitter and power off the first transmitter.

9. The remote control according to claim 1, wherein the first transmitter and the second transmitter are both infrared transmitters.

10. A remote control, comprising:
a first transmitter disposed along a first end of the remote control and configured to transmit a signal to an electronic component;
a second transmitter disposed along a second end opposite the first end and configured to transmit the signal to the electronic component;
a sensor configured to detect a characteristic; and
a processor configured to determine an orientation of the remote control based upon the characteristic detected by the sensor, and to power on one of the first transmitter and the second transmitter based upon the determined orientation of the remote control, wherein the first transmitter is powered by a first power source, and the second transmitter is powered by a second power source different from the first power source.

11. The remote control according to claim 1, further comprising a touch screen, the touch screen comprising a plurality of buttons.

12. The remote control according to claim 11, wherein the processor is configured to detect an orientation of the touch screen.

13. The remote control according to claim 12, wherein the processor is configured to rotate the orientation of the touch screen by 180 degrees in a case where the one of the first transmitter and the second transmitter that is powered on is a different transmitter than the one of the first transmitter and the second transmitter that was powered on in an immediately preceding transmission.

14. The remote control according to claim 1, wherein the remote control comprising a plurality of depressable buttons.

15. A method for transmitting a signal to an electronic component, the method comprising:
determining an orientation of a remote control based upon a characteristic detected by a sensor;
powering on one of a first transmitter and a second transmitter based upon the determined orientation of the remote control;
powering off an other of the first transmitter and the second transmitter based upon the determined orientation of the remote control;
receiving a request to transmit the signal to the electronic component; and
transmitting the signal from the one of the first transmitter and the second transmitter to the electronic component.

16. The method according to claim 15, wherein the receiving the request occurs prior to the determining of the orientation of the remote control.

17. The method according to claim 15, wherein the receiving the request occurs after the determining of the orientation of the remote control.

18. The method according to claim 15, further comprising rotating an orientation of a touch screen within the remote control when the one of the first transmitter and the second transmitter that is powered on is a different transmitter than the one of the first transmitter and the second transmitter that was powered on in an immediately preceding transmission.

19. The remote control according to claim 1, wherein the sensor is a touch sensor.

20. The remote control according to claim 19, wherein the touch sensor is disposed along a bottom face of the remote control.

* * * * *